(12) United States Patent
Tani et al.

(10) Patent No.: US 8,537,186 B2
(45) Date of Patent: Sep. 17, 2013

(54) ADHESIVE LABEL AND APPARATUS FOR PRODUCING THE SAME

(75) Inventors: Kazuo Tani, Chiba (JP); Norimitsu Sanbongi, Chiba (JP); Yoshinori Sato, Chiba (JP)

(73) Assignee: Seiko Instruments Inc. (JP)

( * ) Notice: Subject to any disclaimer, the term of this patent is extended or adjusted under 35 U.S.C. 154(b) by 21 days.

(21) Appl. No.: 13/199,952

(22) Filed: Sep. 13, 2011

(65) Prior Publication Data

US 2012/0069123 A1   Mar. 22, 2012

(30) Foreign Application Priority Data

Sep. 16, 2010   (JP) .................................. 2010-208355

(51) Int. Cl.
*B41J 2/32*   (2006.01)
(52) U.S. Cl.
USPC ......................................................... 347/171
(58) Field of Classification Search
USPC ......................................................... 347/171
See application file for complete search history.

(56) References Cited

U.S. PATENT DOCUMENTS

2012/0082821 A1* 4/2012 Sanbongi et al. ............. 428/116

FOREIGN PATENT DOCUMENTS

| JP | 09111203 | 4/1997 |
| JP | 2000103969 | 4/2000 |
| JP | 2006078733 | 3/2006 |
| JP | 2006083196 | 3/2006 |

OTHER PUBLICATIONS

Machine-generated translation of JP 09-111203, published on Apr. 1997.*
Machine-generated translation of JP 2006-078733, published on Mar. 2006.*

* cited by examiner

*Primary Examiner* — Huan Tran
(74) *Attorney, Agent, or Firm* — Adams & Wilks

(57) ABSTRACT

An adhesive label includes a pressure-sensitive adhesive agent layer formed on one surface of a support. A non-adhesive heat-reactive layer is positioned above the adhesive agent layer and in which openings are formed by heating at a predetermined temperature or higher. An intermediate layer is positioned between the heat-reactive layer and the adhesive agent layer. The intermediate layer and the heat-reactive layer are each formed thinner than the adhesive agent layer. The intermediate layer facilitates the formation of the openings in the heat-reactive layer with good heat energy efficiency and allows the intermediate layer or the adhesive agent layer to be exposed through the openings.

20 Claims, 4 Drawing Sheets

ADHESIVE LABEL AND APPARATUS FOR PRODUCING THE SAME

BACKGROUND OF THE INVENTION

1. Field of the Invention

The present invention relates to an adhesive label and an apparatus for producing the same.

2. Description of the Related Art

As conventional and general adhesive labels, there are widely known adhesive labels which have a printing surface on one side and an adhesive surface on the other side and which are wound into a roll shape or formed into a sheet shape.

Those adhesive labels are usually kept or stored while being overlapped with one another. Therefore, there is known an adhesive label which has the adhesive surface covered with release paper so as to prevent the adhesive labels from adhering to one another. Such an adhesive label is peeled from the release paper for use, and the release paper is disposed of as waste after being used. When an adhesive label is produced by a printing apparatus such as a printer, peeling the adhesive label from the release paper after production has been cumbersome.

As described above, the conventional adhesive labels have various problems regarding the protection of environment, labor, and cost.

In recent years, in view of those problems, there have been proposed adhesive labels in which an adhesive surface of an adhesive label is formed of a thermosensitive adhesive agent, which makes it unnecessary to use the release paper. That is, the thermosensitive adhesive agent used on the adhesive surface is usually non-adhesive, but exhibits adhesiveness by being heated to a predetermined temperature or higher. Therefore, such an adhesive label has no adhesiveness when being kept or stored, and hence the release paper is not required.

The configurations of such an adhesive label and an adhesive sheet using a thermosensitive adhesive agent are described in Japanese Patent Application Laid-open Nos. 2000-103969 and 2006-083196.

Specifically, Japanese Patent Application Laid-open No. 2000-103969 describes the configuration of an adhesive sheet having high adhesiveness after being heated and an excellent anti-blocking property which does not allow blocking to occur even when the adhesive sheet is kept for a long period of time in an unheated state, by using a thermosensitive adhesive agent on an adhesive surface.

Further, Japanese Patent Application Laid-open No. 2006-083196 describes a thermosensitive adhesive label that can be activated with low heat energy and that is excellent in an anti-blocking property and adhesive strength with respect to a rough adherend as well as a smooth adherend.

Specifically, both Japanese Patent Application Laid-open Nos. 2000-103969 and 2006-083196 use a thermosensitive adhesive agent containing a synthetic resin, a solid plasticizer, and a tackifier on an adhesive surface. During heating, the solid plasticizer is melted to allow the synthetic resin to swell or to be softened, and the tackifier causes the adhesive surface to exhibit required adhesiveness with respect to the adherend. That is, in the adhesive label and the adhesive sheet using the thermosensitve adhesive agent of Japanese Patent Application Laid-open Nos. 2000-103969 and 2006-083196, the adhesive surface is kept in a non-adhesive state at room temperature and exhibits adhesiveness by being heated to a predetermined temperature or higher. Therefore, the blocking can be prevented while such an adhesive label and an adhesive sheet are kept or stored at room temperature, which renders release paper unnecessary. Thus, an attempt is made so as to obtain the effects of protection of environment and the reduction in cost involved in the reduction of the number of parts.

Meanwhile, the following patent documents describe other configurations of an adhesive label.

Japanese Patent Application Laid-open No. Hei 09-111203 describes the configuration in which a layer made of a pressure-sensitive adhesive agent is provided on one surface of a base sheet, and the surface of the layer is covered with a microcapsule, to thereby prevent blocking caused by adhesion of the sheets even when the sheets are kept or stored while being overlapped with one another. Specifically, a thermally readily breakable microcapsule layer is provided on the surface of the pressure-sensitive adhesive agent layer, which prevents the adhesive strength of the pressure-sensitive adhesive agent layer from being exhibited during keeping and storage. When the adhesive strength is required, the microcapsule is broken thermally and the lower pressure-sensitive adhesive agent is exposed. Thus, the adhesiveness is exhibited.

Japanese Patent Application Laid-open No. 2006-78733 describes the configuration of an adhesive label in which a recording surface is formed on one surface of a base and an adhesive surface made of a pressure-sensitive adhesive agent is formed on the other surface, and the adhesive surface is covered with a non-adhesive resin film. In this manner, the blocking is prevented during keeping and storage. When the adhesive strength is required, a resin film is opened by being heated selectively, and the lower adhesive agent layer is exposed through openings, to thereby adhere the adhesive label to an adherend.

That is, the adhesive labels in which an adhesive surface is covered with a microcapsule or a resin film described in Japanese Patent Application Laid-open Nos. Hei 09-111203 and 2006-78733 are the same as those of Japanese Patent Application Laid-open Nos. 2000-103969 and 2006-083196 in that release paper is not required. However, in Japanese Patent Application Laid-open Nos. Hei 09-111203 and 2006-78733, an attempt is made so as to obtain stronger adhesive strength by using a pressure-sensitive adhesive agent on an adhesive surface. Then, by covering the surface of an adhesive surface with a non-adhesive microcapsule or resin film layer, the anti-blocking property at a time when the label is kept while being wound into a roll shape or overlapped is enhanced. On the other hand, when adhesiveness is required, openings are formed by thermal breakage of the microcapsule and the thermal contraction of the resin film, and the adhesive surface is exposed through the openings to obtain adhesive strength.

The solid plasticizer contained in the thermosensitive adhesive agent used in the adhesive label as disclosed by Japanese Patent Application Laid-open Nos. 2000-103969 and 2006-083196 has a glass transition point (Tg) of room temperature or lower, and most of the solid plasticizers are usually activated at room temperature or lower. Therefore, even in a kept state at room temperature, some adhesive strength is exhibited inevitably.

That is, it is difficult to bring a thermosensitive adhesive agent layer fully in a non-adhesive state when the layer is stored at room temperature. Therefore, there is a possibility that adhesive labels overlapped with one another adhere to one another to cause a blocking phenomenon. Further, there is a problem that it is difficult to obtain strong adhesiveness properties due to composition properties of a thermosensitive adhesive agent.

In order to solve those problems, it is conceivable to set the glass transition point of the solid plasticizer, at which the solid plasticizer is activated, to be higher than room temperature to suppress the adhesiveness at room temperature, and thus prevent blocking. However, simultaneously, large heat energy is required for exhibiting sufficient adhesiveness.

On the other hand, in order to obtain strong adhesive strength with the above-mentioned configuration, that is, adhesive strength adapted to various adherends, it is conceivable to form a thick layer of the thermosensitive adhesive agent. However, in this case, there arise problems that larger heat energy is required, and a power source capacity of a heat source needs to be increased, etc.

In short, it is difficult to prevent a blocking phenomenon at room temperature and ensure high adhesiveness with relatively low heat energy at the same time.

Further, the solid plasticizer contained in the thermosensitive adhesive agent has crystallinity depending upon temperature. Therefore, the solid plasticizer causes a rapid decrease in adhesiveness caused by recrystallization after thermal activation. It is necessary to use a special solid plasticizer depending upon the storage environment and use environment so as to ensure certain adhesive strength. Thus, there is a problem regarding mass-productivity.

Further, when a thermosensitive adhesive agent is melted by heating, using a thermal head of a thermal printer or the like as a heat source, the thermosensitive adhesive agent is directly brought into contact with the thermal head. Therefore, the molten adhesive agent adheres to a thermal head, a platen roller opposed to the thermal head, a paper feed path, etc. as paste dirt, which may lead to the failure of transportation of an adhesive label and the occurrence of a paper jam.

In order to solve the problems of the thermosensitive adhesive label, in particular, the problems regarding blocking and heating efficiency, the configurations of adhesive labels using a pressure-sensitive adhesive agent as described in Japanese Patent Application Laid-open Nos. Hei 09-111203 and 2006-78733 have been proposed. However, for example, when the microcapsule proposed in Japanese Patent Application Laid-open No. Hei 09-111203 is used, it is difficult to exhibit adhesiveness effectively. That is, the following problems are noted. The microcapsule has a spherical shape, and hence, is heated in a point contact with a heat source such as a thermal head or the like. Therefore, the heat conductivity is poor, and effective breakage cannot be performed. In addition, a shell of the capsule remains on an adhesive agent to weaken adhesive strength, or the shell adheres to the thermal head as a heat source to further degrade heat, efficiency. Thus, required adhesive strength cannot be obtained sufficiently.

On the other hand, as proposed by Japanese Patent Application Laid-open No. 2006-78733, when the surface of the pressure-sensitive adhesive agent layer is covered with a resin film layer, the adhesive strength which is originally intended to act on an adherend causes the resin film to be adhered or fixed, which leads to become a factor for inhibiting the thermal deformation and thermal contraction of the resin film by heating. Further, the following problems are noted. The heat efficiency is poor depending upon the material of the resin film, and thus, a thermal head having high temperature properties is required so as to form openings. When a thermal printer that is driven with small electric power is used, heat energy cannot be controlled efficiently. Therefore, the resin film cannot be opened sufficiently, and consequently, required adhesive strength cannot be obtained.

The conventional adhesive labels described above do not require release paper. However, in order to allow the adhesive labels to be non-adhesive at room temperature and to exhibit adhesiveness properties by heating, there is a common technical problem that heat energy increases.

Considering the reaction of the material by heating, first, increasing the temperature of the material to be heated to induce the reaction is a basic precondition. Further, it is known that, from the viewpoint of heat capacity, the increase in temperature of the material is mainly caused by a specific heat and mass of the material to be heated, and a small specific heat of the material and a small layer thickness with a small amount of coating are advantageous. However, the adhesive label is generally targeted to an unspecified adherend. Therefore, the coating amount of an adhesive agent of the adhesive label tends to increase.

SUMMARY OF THE INVENTION

It is an object of the present invention is to solve the aforementioned problems.

In view of the above-mentioned conventional problems, according to the present invention, a film of an uppermost layer is set as a target to be heated, and a target to be reacted by heating and an adhesive layer are provided independently. Thus, an adhesive label is obtained, which is capable of achieving enhanced sensitivity while minimizing the heating for causing adhesiveness properties to exhibit, and further, ensuring adhesive strength and stability that are properties of a pressure-sensitive adhesive agent.

According to the present invention, the above-mentioned conventional problems are solved by an adhesive label in which an adhesive surface is formed on one surface of a base, and an intermediate layer and a heat-reactive layer are further provided thereon.

More specifically, an adhesive surface includes an adhesive agent layer made of a pressure-sensitive adhesive agent. Above the adhesive agent layer, the non-adhesive heat-reactive layer is formed, and the intermediate layer for facilitating the formation of openings of the heat-reactive layer is provided between the adhesive agent layer and the heat-reactive layer. Thus, adhesiveness is exhibited via openings of the heat-reactive layer to be formed by heating.

The intermediate layer is formed of a low-adhesive layer having adhesiveness smaller than that of the pressure-sensitive adhesive agent layer or a heat-shielding layer made of a non-adhesive porous body having a heat-shielding effect, and the heat-reactive layer and the intermediate layer are formed thinner than the adhesive agent layer.

On the other hand, an apparatus for producing an adhesive label of the present invention includes a storage part for storing at least an adhesive label, and heating means. The heat-reactive layer of the adhesive label is selectively heated via the heating means to form the openings.

According to the present invention, the entire adhesive surface of the adhesive label is covered with the non-adhesive heat-reactive layer, and thus, release paper is not required. Therefore, when the adhesive label is kept or stored under an environment at room temperature, the overlapped adhesive labels do not adhere to one another, and the occurrence of so-called blocking can be prevented.

Further, due to the intermediate layer provided between the adhesive agent layer and the heat-reactive layer, satisfactory heat efficiency can be obtained. Therefore, the openings can be formed in the heat-reactive layer efficiently with low heat energy, and hence it is possible to provide an adhesive label capable of exhibiting adhesiveness of the adhesive agent layer.

Further, there are provided such effects that, because the heat efficiency becomes satisfactory, drive power of a thermal head or the like can be decreased, and the power source and the apparatus for producing an adhesive label can be miniaturized.

Further, by using a thermal head of an apparatus for producing an adhesive label as a heat source, desired adhesive strength can be controlled freely to a desired adhesive region of an adhesive surface of an adhesive label. Further, due to the use of a pressure-sensitive adhesive agent, an adhesive label that exhibits sufficient adhesiveness properties according to an adherend can be obtained irrespective of whether the adherend has a rough surface or a smooth surface.

Further, waste such as release paper is eliminated, and hence an adhesive label also preferred from the viewpoint of the protection of an environment can be provided.

In addition, in the case where adhesive labels are wound into a roll shape, etc., more adhesive labels can be provided in the same space as that of the adhesive labels with release paper by the thickness of unnecessary release paper. Consequently, a unit cost of the adhesive label can be suppressed low.

Simultaneously, by using the adhesive label of the present invention, the adhesion of paste dirt to the apparatus for producing an adhesive label, and paper jam and failure of transportation of the adhesive label caused by the adhesion of paste dirt can be eliminated.

DETAILED DESCRIPTION OF THE PREFERRED EMBODIMENT

Figure 1:
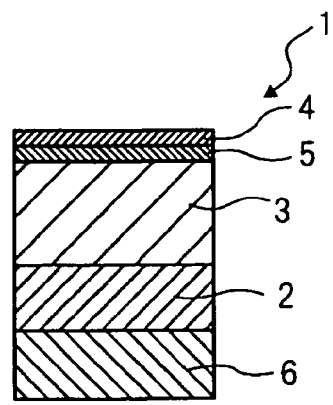
FIG. 1 is a cross-sectional view illustrating an adhesive label in an unheated state according to Embodiment 1 of the present invention.
Figure 7:
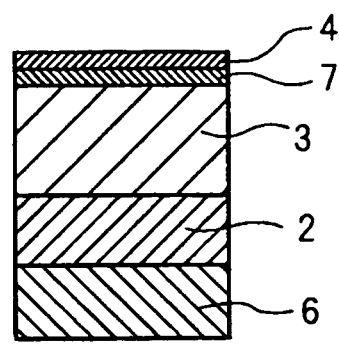
FIG. 7 is a cross-sectional view illustrating an adhesive label in an unheated state according to Embodiment 2 of the present invention.

First, a mechanism for forming openings 4a illustrated in FIGS. 3A to 3C, 5, and 8 is described in a configuration of an adhesive label of FIGS. 1 and 7 that is common to an embodiment of the present invention.

An adhesive label 1 illustrated in FIGS. 1 and 7 includes an adhesive agent layer 3 made of a pressure-sensitive adhesive agent, which is formed on one surface of a non-adhesive support 2, a non-adhesive heat-reactive layer 4 made of olefin-based resin, which is positioned above the adhesive agent layer 3, and an intermediate layer (a low-adhesive layer 5 as an example) as one of main features of the present invention, which is positioned between the heat-reactive layer 4 and the adhesive agent layer 3. In order to exhibit adhesiveness in the adhesive label 1, the openings 4a are formed in the heat-reactive layer 4 by heating a material constituting the heat-reactive layer 4 or other such method. However, even if cracks or the openings 4a are formed using thermal deformation or thermal contraction in the heat reactive layer 4 to be heated, it is not easy to form the openings 4a and the mere formation of the openings 4a does not lead to the enhancement of sensitivity uniformly.

Further, unless the size, shape, and formation position of the openings 4a can be controlled with good precision, the openings 4a for obtaining desired adhesiveness properties of the label and a total opening area thereof cannot be obtained appropriately, which makes it difficult to use the low-adhesive layer 5 and the adhesive agent layer 3 exposed through the openings 4a effectively.

Even if the openings 4a can be formed in the heat-reactive layer 4, shreds of a resin film from random cracks and the unbalance of shreds occur, and shreds of the thus shredded resin film scatter on the adhesive agent layer 4 and in the production apparatus. This makes it difficult to obtain desired adhesiveness properties and to ensure a paper-running property in the apparatus.

In view of the above, in the present invention, the phase change of the material constituting the heat reactive layer 4, that is, the change in a state of liquefaction and solidification of a film by heating was evaluated in detail by observation, which led to the proposal of using this mechanism.

In this embodiment, the heat-reactive layer 4 is heated to a temperature in a range of the glass transition point of the material for the heat-reactive layer 4 or higher and the melting point thereof or lower. For example, in the case where the heat-reactive layer 4 is made of polyethyleneterephthalate (PET), the heat-reactive layer 4 is heated to a temperature of 70° C. or higher and 260° C. or lower, which is a temperature range of the glass transition point or higher and the melting point or lower in terms of the physical properties of PET. For example, in the case where the heat-reactive layer 4 is made of polystyrene (PS), the heat-reactive layer 4 is heated to a temperature of 90° C. or higher and 230° C. or lower, which is a temperature range of the glass transition point of PS or higher and the melting point thereof or lower. At the glass transition point or higher, the heat-reactive layer 4 softens to flow from a solid state, and at the melting point or lower, the heat-reactive layer 4 is liquefied. In the liquefied state, due to the cohesion caused by the intermolecular force of the material for the heat-reactive layer 4, the openings 4a in a shape close to a perfect circle are formed with respect to a heating point. Then, the material is solidified along with a decrease in temperature, and thus, stable opening shapes are formed. The formation of the stable opening shapes depends upon the configuration of the adhesive label finally. The reason for this is as follows. The surface tension of liquid liquefied by a phase change is not the only factor for forming openings, and it is necessary to consider the influence of the state of an interface with the adjacent adhesive layer. Considering this, appropriate heating conditions are obtained within the above-mentioned temperature range. Under the appropriate heating conditions of the present invention, the openings 4a with high heat efficiency and very stable reproducibility are formed, compared with the cracks and openings to be formed by simple heating or physical or mechanical methods whose conditions are not defined strictly. Thus, the shape and position of the openings 4a can be controlled with good precision.

Figure 3A:
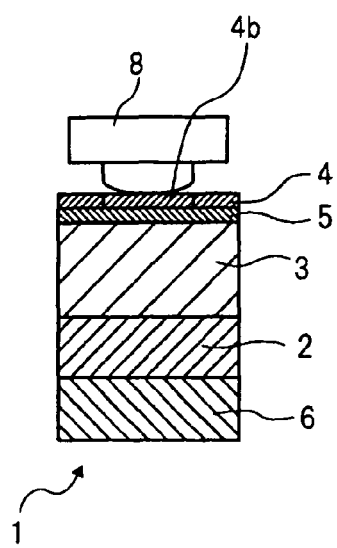
FIGS. 3A to 3C are cross-sectional views illustrating production steps of the adhesive label illustrated in FIG. 1 in the successive order.
Figure 3B:
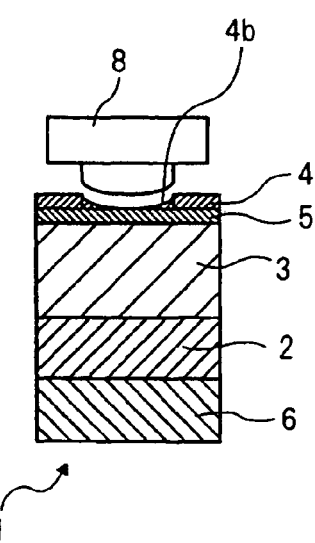
Figure 3C:
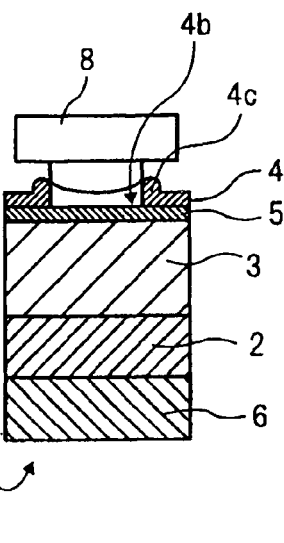
Figure 4:
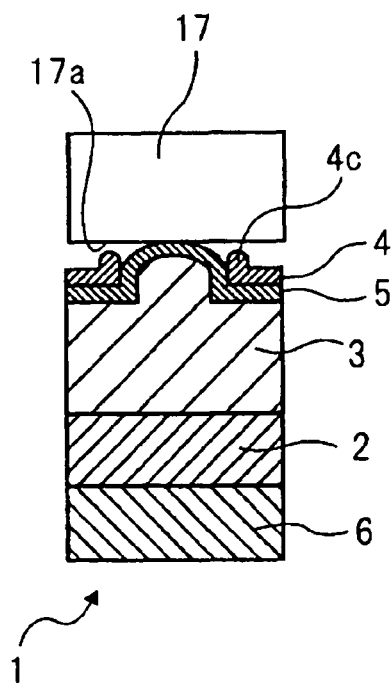
FIG. 4 is a cross-sectional view illustrating an adhered state of the adhesive label illustrated in FIG. 1.

Further, due to the surface tension as a force acting on the liquid interface in which the openings 4a are to be formed with a minimum area, an inner circumferential edge 4c of each opening 4a becomes slightly thick (see FIGS. 3C and 4). The inner circumferential edge 4c of the opening 4a that has become thick suppresses the direct contact between the low-adhesive layer 5 exposed in the opening 4a and other members of a thermal head, etc. Thus, the low-adhesive layer 5 does not adhere to the other members by accident, a part of the low-adhesive layer 5 does not come off accordingly, or a part of the adhesive agent does not remain as dirt in the other members.

More specifically, when the heat-reactive layer 4 is heated to a temperature in the range of the glass transition point or higher and the melting point or lower, molecules aggregate due to the interfacial tension between the heat-reactive layer 4 and the adjacent low-adhesive layer 5, and the surface tension of the heat-reactive layer 4 itself in a liquid state, and the aggregated molecules flow to the outer side with the heating point being the center to form the openings 4a.

At this time, the force of the heat-reactive layer 4 acting on the interface functions so as to form the openings 4a into a shape with a minimum area. By forming the heat-reactive layer 4 to have a certain thickness (several μm) or less with the selection of a material having a small heat capacity, that is, a small specific heat, the openings 4a can be formed easily. In the case where the heat-reactive layer 4 is made of a stretched resin film, when heat exceeding the temperature during stretching is applied to the heat-reactive layer 4, the stretched film itself is provided with a force for returning to the state before stretching. Thus, as described above, in the heat-reactive layer 4, it is possible to form the openings 4a easily with the heating point being the center.

Embodiment 1

FIG. 1 is a cross-sectional view illustrating an adhesive label of Embodiment 1 of the present invention.

An adhesive label 1 includes an adhesive agent layer 3 made of a pressure-sensitive adhesive agent, which is formed on one mayor surface of a non-adhesive sheet-shaped support 2 made of paper, a polymer base, or the like, a non-adhesive heat-reactive layer 4 made of olefin-based resin, which is positioned above the adhesive agent layer 3, and a low-adhesive layer 5 as an example of the intermediate layer, which is positioned between the heat-reactive layer 4 and the adhesive agent layer 3. The low-adhesive layer 5 is made of a pressure-sensitive adhesive agent similarly to the adhesive agent layer 3, but has lower adhesive strength compared with that of the adhesive agent layer 3. Further, a printing layer 6 is formed on the other major surface of the support 2.

Figure 2:
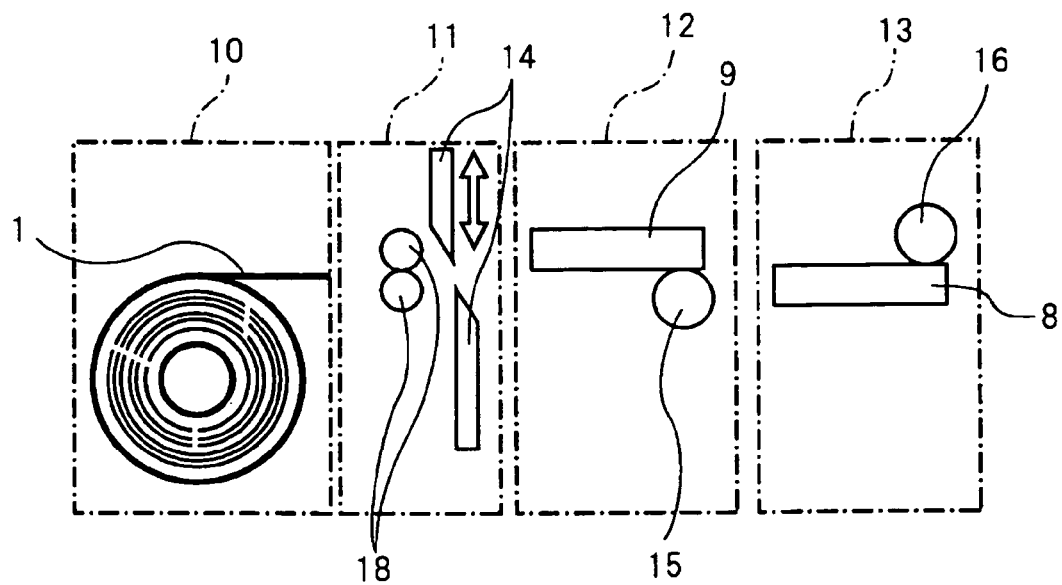
FIG. 2 is a schematic view illustrating an example of an apparatus for producing an adhesive label of the present invention.

In an unheated state as illustrated in FIG. 1, the adhesive label 1 cannot exhibit adhesiveness because the adhesive agent layer 3 and the low-adhesive layer 5 are covered with the non-adhesive heat-reactive layer 4. Therefore, even when a plurality of adhesive labels 1 are stored while being stacked or the long adhesive label 1 is stored while being wound into a roll shape as illustrated in FIG. 2, the adhesive labels 1 do not adhere to each other, which can prevent a so-called blocking phenomenon. Further, because the adhesive label 1 is kept in a non-adhesive state in the unheated state, the adhesive label 1 does not adhere to various members in an apparatus for producing an adhesive label, and thus, a paper-running property is satisfactory.

During the use of the adhesive label 1, the heat-reactive layer 4 is heated selectively using heating means such as a thermal head 8 (see FIG. 2), and the openings 4a are formed in the heat-reactive layer 4. Thus, the low-adhesive layer 5 positioned below the heat-reactive layer 4 is exposed to the outside through the openings 4a of the heat-reactive layer 4, and hence the adhesive label 1 can exhibit adhesiveness. The adhesive label 1 that has thus been heat-treated uses a pressure-sensitive adhesive agent, and hence, the adhesive label 1 can be attached to an adherend 17 with a smooth surface as well as an adherend 17 with a rough surface.

The printing layer 6 of the adhesive label 1 is heated by the thermal head 8 for heating the heat-reactive layer 4 or another thermal head 9 (see FIG. 2) with a similar configuration to that of the thermal head 8 irrespective of whether the heating is conducted before or after the heating of the heat-reactive layer 4, and thus, desired characters, marks, patterns, etc. are recorded on the printing layer 6.

FIG. 2 is a schematic view of an apparatus for producing an adhesive label.

The apparatus for producing an adhesive label includes a roll paper storage part 10, a roll paper cutting part 11, a label recording part 12, and an adhesiveness exhibiting part 13.

The roll paper storage part 10 holds the adhesive label 1 wound into a roll shape, and the adhesive label 1 unreeled from the roll paper storage part 10 is transported by transport rollers 18 to reach the position of cutter members 14 of the roll paper cutting part 11. The adhesive label 1 at the position of the cutter members 14 is cut to have a desired length by the cutter members 14. The cut adhesive label 1 is sent to the recording part 12. In the recording part 12, the adhesive label 1 is transported while being sandwiched between a platen 15 and a thermal head 9, and desired printing is performed on the printing layer 6 by the thermal head 9 at a desired position. After that, the adhesive label 1 is transported to the adhesiveness exhibiting part 13.

The adhesive label 1 transported from the recording part 12 is heated at a desired position while being sandwiched between a platen roller 16 and the thermal head 8 in the adhesiveness exhibiting part 13.

Accordingly, desired openings 4a are selectively formed at desired positions of the heat-reactive layer 4 by the thermal head 8. Specifically, as illustrated in FIGS. 3A and 3B, a portion 4b of the heat-reactive layer 4 that is in contact with the thermal head 8 is heated to undergo a phase change so that the opening 4a is formed as illustrated in FIG. 3C. At this time, the low-adhesive layer 5 positioned below the heat-reactive layer 4 has a heat capacity larger than that of the heat-reactive layer 4, and hence, the low-adhesive layer 5 is not increased in temperature and is not deformed largely.

Figure 5:
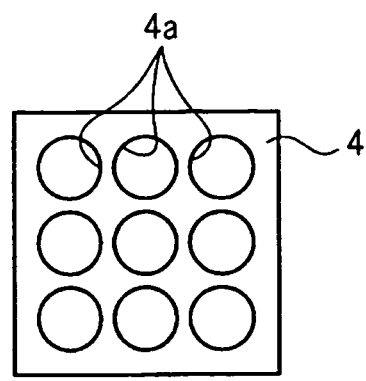
FIG. 5 is a plan view illustrating an arrangement pattern of openings when the adhesive label of the present invention is completed.

As an example, as illustrated in FIG. 5, a plurality of openings 4a arranged in a matrix can be formed at equal intervals. Then, as illustrated in FIG. 4, when the adhesive label 1 with the openings 4a formed therein is pressed lightly against the adherend 17, the low-adhesive layer 5 or the adhesive agent layer 3 exposed through the openings 4a adheres to the adherend 17, and these adhesive agents adhere to a surface 17a of the adherend 17 while being deformed therealong.

Next, in this embodiment, the technical significance of the low-adhesive layer 5 provided between the adhesive agent layer 3 and the heat-reactive layer 4 is described.

As described above, according to the prior art, it is difficult to form openings with a desired size and shape in the heat-reactive layer at equal intervals with good precision. As a result, shreds of a resin film from random cracks and the unbalance of the shreds occur, and shreds of the thus shredded resin film scatter on the adhesive agent layer and in the production apparatus. It is also difficult to obtain desired adhesiveness properties and ensure a paper-running property in the production apparatus. Further, the resin film may be burnt or carbonized due to heating.

One of the reasons is as follows. The adhesive strength to be originally acted on the adherend inhibits the formation of the openings of the upper resin film to decrease a heating efficiency for forming the openings. As a result, the unbalance of the openings and the like occur to prevent adhesiveness properties with reproducibility from being obtained.

That is, according to the prior art, even if the heat-reactive layer is to be deformed or thermally contract by heating, because the lower adhesive agent layer is fixed, it is not easy for the heat-reactive layer to be separated from the adhesive agent layer to undergo deformation and thermal contraction.

Therefore, in this embodiment, by providing the low-adhesive layer 5 adjacently below the heat-reactive layer 4 as the intermediate layer, the adhesiveness resistance at a time of opening of the heat-reactive layer 4 is decreased to facilitate the formation of the openings 4a in the heat-reactive layer 4.

Thus, in this embodiment, the heat-reactive layer 4 is heated partially in a desired size and shape to form the openings 4a, and the lower low-adhesive layer 5 is exposed to the outside through the openings 4a. Thus, desired adhesiveness is obtained.

Here, the thickness of the low-adhesive layer 5 is 3 μm or less, preferably 1 μm or less, which is smaller than that of the adhesive agent layer 3.

Figure 6:
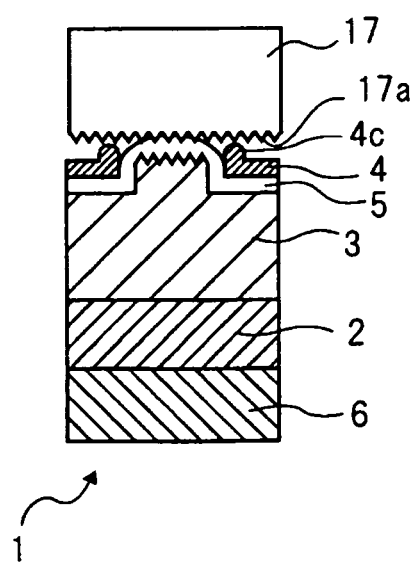
FIG. 6 is a cross-sectional view illustrating another example of the adhered state of the adhesive label illustrated in FIG. 1.

As illustrated in FIG. 4, in the case where the surface 17a of the adherend 17 to which the adhesive label 17 is to be attached is flat, adhesiveness is generally satisfactory, and hence, it is considered that sufficient adhesive strength is obtained even with the low-adhesive layer 5 alone. On the other hand, in the case where the adherend 17 has a complicated three-dimensional shape or the surface 17a of the adherend 17 is a rough surface with large unevenness as illustrated in FIG. 6, when the adhesive label 1 is attached to the adherend 17, the thin low-adhesive layer 5 not only adheres to the surface 17a of the adherend 17 but also is deformed along the surface 17a of the adherend 17 in cooperation with the lower adhesive agent layer 3. As a result, the adhesive label 1 is attached strongly to the adherend 17.

Further, in order to form the openings 4a easily and satisfactorily, the heat-reactive layer 4 is formed to have a thickness of, for example, 3 μm or less, preferably 1 μm or less.

On the other hand, it is preferred that the adhesive agent layer 3 be formed relatively thick so as to be adapted to an adherend in a complicated shape or a rough surface as descried above with sufficient adhesive strength. For example, the adhesive agent layer 3 is formed to have a thickness of, for example, 5 μm or more, preferably 10 μm or more.

As described above, in this embodiment, because the thin low-adhesive layer 5 is formed below the heat-reactive layer 4, the openings 4a with a desired size and shape can be easily formed in the heat-reactive layer 4 uniformly at predetermined intervals with good precision (see FIG. 5). Thus, desired adhesiveness properties of the adhesive label 1 are obtained easily, and desired adhesive strength can be obtained variably.

Embodiment 2

FIG. 7 is a cross-sectional view illustrating an adhesive label of Embodiment 2 of the present invention.

In this example, an adhesive label 1 includes an adhesive agent layer 3 made of a pressure-sensitive adhesive agent, which is formed on one major surface of a non-adhesive sheet-shaped support 2 made of paper, a polymer base, or the like, a non-adhesive heat-reactive layer 4 made of olefin-based resin, which is positioned above the adhesive agent layer 3, and a heat-shielding layer 7 made of a porous body as an intermediate layer, which is positioned between the heat-reactive layer 4 and the adhesive agent layer 3.

The heat-shielding layer 7 is made of a non-adhesive polymer porous body. A printing layer 6 is formed on the other major surface of the support 2.

An apparatus for producing an adhesive label of this embodiment is substantially the same as that of Embodiment 1, and hence, the description thereof is omitted.

The adhesive label 1 of this embodiment does not exhibit adhesiveness in an unheated state similarly to Embodiment 1. Therefore, a blocking phenomenon can be prevented and a paper-running property is satisfactory in the apparatus. Then, during the use of the adhesive label 1, the heat-reactive layer 4 is heated using heating means such as a thermal head 8 provided in the apparatus for producing an adhesive label, to thereby form openings 4a in the heat-reactive layer 4, and an adhesive agent of the adhesive agent layer 3 positioned below the heat-reactive layer 4 can move easily to the surface layer through the openings 4a.

The heat-shielding layer 7 as the intermediate layer has a heat-shielding function to prevent, when the heat-reactive layer 4 of the adhesive label 1 is heated, heat from being transmitted in a planar manner to the periphery of the heat-reactive layer 4 other than a region to be heated, which can enhance the efficiency of heat energy for forming the openings 4a and simultaneously ensure the precision and reproducibility of the shape of the openings.

Although the heat-shielding layer 7 in this embodiment is non-adhesive, a part of the adhesive agent of the adhesive agent layer 3 adheres to the heat-shielding layer 7 through holes of the heat-shielding layer 7. The porous body constituting the heat-shielding layer 7 has a large number of holes. The holes include through-holes passing in a layer thickness direction, non-through-holes that are opened toward any one of the surfaces of the heat-shielding layer 7 but are not opened toward the other surface, and non-open holes that are closed inside the heat-shielding layer 7 without being opened toward any of the surfaces thereof. Of the large number of holes of the porous body, only the through-holes mainly contribute so that the adhesive agent of the adhesive agent layer 3 adheres to the heat-reactive layer 4 as describe above. Therefore, only a part of the adhesive agent of the adhesive agent layer 3 adheres to the heat-reactive layer 4 via the through-holes. In other words, the adhesive agent adheres to only a part of the total area of the heat-reactive layer 4. Therefore, the openings 4a of the heat-reactive layer 4 are formed easily almost without being inhibited. As a result, the openings 4a can be formed with good precision.

The thickness of the heat-shielding layer 7 is smaller than that of the adhesive agent layer 3, and for example, the thickness is 3 μm or less, preferably 1 μm or less.

The thicknesses of the heat-reactive layer 4 and the adhesive agent layer 3 of this embodiment are the same as those described in Embodiment 1.

Thus, by providing the heat-shielding layer 7 of this embodiment, the openings 4a with a desired size and shape can be easily formed in the heat-reactive layer 4 uniformly at predetermined intervals, and thus it is possible to obtain the adhesive label 1 in which desired adhesiveness properties are obtained easily.

Further, even in this embodiment, when the heat-reactive layer 4 is heated to a temperature in a range of the glass transition point of the material for the heat-reactive layer 4 or higher and the melting point thereof or lower to form the openings 4a using the phase change, the same effects as describe above are obtained.

Specific Examples of a Material for Each Layer of an Adhesive Label

Each layer of the adhesive label 1 can be formed by attaching a film, applying a material in a molten state, or a coextrusion method. In the case of applying a material, there is used coating means, which is selected from a bar coater, an air knife coater, a squeeze coater, and a gravure coater, considering the viscosity of the material, the thickness to be formed, and the dry process.

In producing the adhesive label 1 in a multi-layered structure, there is a possibility that curls caused by a residual stress, thermal contraction, and moisture absorption may be formed in the material of each layer, depending upon the layer formation and the treatment after the layer formation. Thus, for forming each layer, dimensional stability, surface treatment, moisture resistance, solvent resistance, mechanical strength, flatness, etc. need to be considered. In particular, regarding the heat-reactive layer 4 as the surface layer of the adhesive label 1, it is also important to consider the friction coefficient of a layer surface and the flexibility at a time when the heat-reactive layer 4 comes into contact with heating means of an apparatus for producing an adhesive label.

Based on the above, the specific examples of the material for each layer used in Embodiments 1 and 2 described above are described below.

The heat-reactive layer 4 is formed of: an olefin-based resin which is utilized as a general-purpose resin in various applications, such as polyethylene (PE), polyvinyl chloride (PVC), or polypropylene (PP); a multilayer polyolefin (PO) film obtained by laminating films of those resins (such as a PE film and a PP film); polystyrene (PS), polyethylene terephthalate (PET), or a hybrid film obtained by laminating a PS film and a PET film; an ethylene-vinyl acetate copolymer (EVA)-based resin; a polyvinyl alcohol (PVA)-based resin; a polylactic acid (PLA)-based resin as a plant-based material; or the like.

It is preferred that the heat-reactive layer 4 be stable chemically and physically at room temperature and that the heat-reactive layer 4 be used in a temperature range in which the heat-reactive layer 4 can be heated by heating means such as a general thermal head.

Further, it is preferred that the heat-reactive layer 4 be made of a material having surface tension that increases a contact angle during heating, regarding the wettability with respect to the adjacent intermediate layer 5, 7. It is also preferred that the heat-reactive layer 4 be made of a material having a small melting heat amount in terms of physical properties and a small heat energy amount at a time of a phase change for forming the openings 4a. In the case where the heat-reactive layer 4 is made of a resin film, it is preferred that the heat-reactive layer 4 be a uniaxially stretched film or a biaxially stretched film.

Further, the heat-reactive layer is subjected to surface reforming by electron beam treatment to obtain polymerization and cross-linking properties of molecules in terms of physical properties, independently of the basic physical properties of the olefin-based resin, and thus, the heat-reactive layer of the adhesive label of the present invention can be optimized.

The adhesive agent layer 3 is made of a pressure-sensitive adhesive material that can be adhesive only by applying a slight pressure at room temperature for a short period of time, without using water, a solvent, heat, or the like. It is preferred that the pressure-sensitive adhesive material have a cohesion, elasticity, and high adhesiveness, and can be peeled from a hard smooth surface. The adhesive agent layer 3 is generally formed of: a rubber-based pressure-sensitive adhesive such as natural rubber, styrene-butadiene rubber (SBR), or polyisobutylene rubber; an acrylic pressure-sensitive adhesive having a cross-link system including a monomer having a low glass transition point and a cross-linking agent; an acrylic pressure-sensitive adhesive having a non-cross-linked system obtained by copolymerizing a monomer having a low glass transition point and a monomer having a high glass transition point; a silicone-based pressure-sensitive adhesive formed of a silicone having a high cohesion and a silicone resin having a high adhesive strength; or the like.

Further, it is preferred that the adhesive agent layer 3 be made of a material having a large difference in heat capacity from the upper heat-reactive layer 4.

The low-adhesive layer 5 in Embodiment 1 may be made of a material similar to that of the adhesive agent layer 3, but has adhesiveness lower than that of the adhesive agent layer 3. It is preferred that the low-adhesive layer 5 be made of a low-molecular material and have small adhesive strength with respect to the heat-reactive layer 4 to facilitate the formation of the openings 4a. Further, the low-adhesive layer 5 can ensure initial adhesiveness properties with respect to the adherend 17. Further, for particular applications, an adhesive other than a pressure-sensitive adhesive agent can also be used.

The heat-shielding layer 7 of Embodiment 2 is made of a membrane, a film, or a sheet of a polymer porous body formed by various methods such as phase separation, extraction, stretching, melt extraction, chemical treatment, irradiation etching, fusion, and foaming. Such a polymer porous body is produced by a combination of various polymer raw materials and a technology of making porous, and has a feature of exhibiting characteristic functions due to a pore diameter, a porosity, strength, hardness, surface properties, a shape, etc. Of these polymer porous bodies, a film and a membrane of microporous plastic having pores with the shape and size controlled are generally used in applications in which a separation function, a diaphragm function, etc. of a material are utilized.

In Embodiment 2, in order to utilize the adhesiveness of the lower adhesive agent layer 3 to the maximum extent while ensuring basic functions of diffusing and shielding head based on a voidage, it is preferred that the heat-shielding layer 7 be as thin as, for example, several μm or less. Further, the pore diameter that is a factor of determining the voidage of a porous body of the heat-shielding layer 7 is set so that the adhesiveness of the adhesive agent layer 3 can be utilized to the maximum extent as described above, considering the rheology characteristics and the molecular size of the lower adhesive agent layer 3. Further, non-woven fabric can also be used as the heat-shielding layer 7.

Considering the relationship between the heat-reactive layer 4 and the intermediate layer 5, 7 described above, it is preferred that the difference in heat capacity between the heat-reactive layer 4 and the intermediate layer 5, 7 be large. That is, because the heat capacity of the heat-reactive layer 4 in the uppermost layer to be heated is small, the heat-reactive layer 4 responses to low heat energy and aggregates on a molecular level to form the openings 4a. At this time, the heat capacity of the adjacent intermediate layer 5, 7 is large, and hence, the intermediate layer 5, 7 do not increase in temperature to such a degree that deformation and reaction occur at a time of opening of the heat-reactive layer.

Method of Heating a Heat-Reactive Layer

As heating means with respect to the heat-reactive layer 4 of the adhesive label 1 of the present invention, as described above, a general thermal head 8 of a thermal printer and the like is preferred to be used. The thermal head 8 can arbitrarily select a heating point. Therefore, the thermal head 8 can arbitrarily set the size and shape of each opening 4a to be formed in the heat-reactive layer 4, and arbitrarily set a total area of all of the openings 4a and the arrangement pattern of the respective openings 4a to control the adhesive strength and set an adhesive region.

Figure 8:
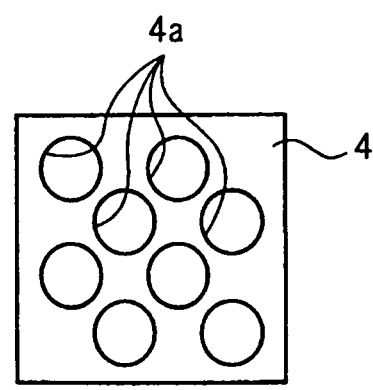
FIG. 8 is a plan view illustrating another example of the arrangement pattern of the openings when the adhesive label of the present invention is completed.

Thus, the adhesive strength of the lower adhesive agent exposed through the openings 4a can be controlled. In general, as the total area of the openings 4a becomes larger, the adhesive strength increases. Further, by setting the arrangement pattern of the openings 4a to be a checked pattern, a zigzag pattern, or a polygonal geometric pattern as illustrated in FIGS. 5 and 8, the adhesive strength can be controlled while the partial mechanical strength of the heat-reactive layer between the respective openings 4a is enhanced, without the respective openings 4a being connected to each other.

This is effective for stabilizing the film structure of the adhesive label 1 to ensure the opening area with reproducibility, and obtaining adhesive strength stable during actual use, at which an adhesive agent obtained through an opening portion can be used.

Advantage of an Adhesive Label

The advantage of the adhesive label 1 of Embodiments 1 and 2 described above is described below.

The heat-reactive layer 4 of the adhesive label 1 is thin, and hence the openings 4a are formed even with low heat energy to allow the adhesiveness of the lower layer to be exhibited easily, resulting in satisfactory energy efficiency. The heat-reactive layer 4 can be formed of a general-purpose olefin-based resin, which lowers the cost. Further, an engineering resin system other than the olefin-based resin can also be used for a particular use.

Under the unheated state, the surface of the adhesive label 1 is covered with the non-adhesive heat-reactive layer 4 without the openings 4a. Therefore, blocking can be prevented and a paper-running property at a time of the use of an apparatus for producing an adhesive label is satisfactory. On the other hand, the adhesive agent layer 3 positioned below the intermediate layer 5 or 7 can be formed sufficiently thick, and hence a sufficient amount of an adhesive agent flows in the surface 17a even if the adherend 17 has a complicated shape or the surface 17a is rough. Thus, high mechanical bonding can be obtained.

Further, by adjusting the heating amount and the heating pattern of the heat-reactive layer 4, the adhesive region and the adhesive strength can be controlled easily and freely.

Further, by using the adhesive agent layer 3 not containing a solid plasticizer, very stable adhesiveness not depending upon an environment can be maintained and ensured.

Particularly, in the case where the openings 4a are formed using a phase change, an error of the shape, size, and arrangement pattern of the openings 4a can be made small. Therefore, the reliability of the control of the adhesive region and the adhesive strength is high. Further, in this case, the inner circumferential edge 4c of the opening 4a after heating becomes thick, and hence the inner circumferential edge 4c functions as a guard to prevent the direct contact between the adhesive agent layer and the members in the apparatus. Even after heating, a sufficient paper-running property can be ensured in the apparatus for producing an adhesive label.

The printing layer 6 formed on the other side of the support 2 is not limited to one that can be recorded by a thermal head system which performs printing with heat as in Embodiments 1 and 2, and may be those which can be recorded by other printing systems such as an ink-jet system and an electrophotographic system. Further, on the other side of the support 2, display means such as a radio tag (e.g., RFID) or electronic paper can also be provided instead of a printable printing layer.

What is claimed is:

1. An adhesive label, comprising:
    a support;
    a pressure-sensitive adhesive agent layer formed on one surface of the support;
    a non-adhesive heat-reactive layer which is positioned above the pressure-sensitive adhesive agent layer and in which an opening is formed by heating at a predetermined temperature or higher; and
    an intermediate layer positioned between the non-adhesive heat-reactive layer and the pressure-sensitive adhesive agent layer, for facilitating the formation of the opening in the non-adhesive heat-reactive layer during the heating.

2. An adhesive label according to claim 1, wherein the intermediate layer comprises a low-adhesive layer having adhesive strength smaller than adhesive strength of the pressure-sensitive adhesive agent layer.

3. An adhesive label according to claim 1, wherein the intermediate layer comprises a heat-shielding layer made of a non-adhesive porous body.

4. An adhesive label according to claim 1, wherein the intermediate layer and the non-adhesive heat-reactive layer are thinner than the pressure-sensitive adhesive agent layer.

5. An adhesive label according to claim 1, wherein the pressure-sensitive adhesive agent layer is made of a material which has adhesiveness properties that do not change at the predetermined temperature for forming the opening in the non-adhesive heat-reactive layer.

6. An adhesive label according to claim 1, wherein the predetermined temperature for forming the opening in the non-adhesive heat-reactive layer is in a range of a glass transition point of a material for the non-adhesive heat-reactive layer or higher and a melting point of the material or lower.

7. An adhesive label according to claim 1, further comprising a printing layer formed on another surface of the support.

8. An apparatus for producing an adhesive label including a support, a pressure-sensitive adhesive agent layer formed on one surface of the support, a non-adhesive heat-reactive layer positioned above the pressure-sensitive adhesive agent layer, and an intermediate layer positioned between the non-adhesive heat-reactive layer and the pressure-sensitive adhesive agent layer, the apparatus comprising:
    a storage part for storing the adhesive label in an unheated state; and
    heating means for forming an opening in the non-adhesive heat-reactive layer by heating thereby exposing the pressure-sensitive adhesive agent layer through the opening.

9. An apparatus for producing an adhesive label according to claim 8, wherein the heating means comprises a thermal head configured to form a plurality of openings with a desired pattern by selectively heating the non-adhesive heat-reactive layer at arbitrary positions.

10. An apparatus for producing an adhesive label according to claim 8, further comprising recording means for recording desired printing information on a printing layer formed on another surface of the support.

11. An apparatus for producing an adhesive label according to claim 8, wherein the recording means comprises a thermal head.

12. An apparatus for producing an adhesive label according to claim 8, wherein the desired printing information is recorded by the recording means other than a thermal head.

13. An adhesive label, comprising:
- a support having opposed major surfaces;
- a pressure-sensitive adhesive agent layer formed on one major surface of the support;
- a non-adhesive heat-reactive layer which is positioned over the pressure-sensitive adhesive agent layer and in which through-openings can be formed by selectively heating the non-adhesive heat reactive layer at a predetermined temperature or higher at arbitrary positions; and
- an intermediate layer positioned between the pressure-sensitive adhesive agent layer and the non-adhesive heat-reactive layer for facilitating formation of the through-openings in the non-adhesive heat-reactive layer during heating thereof.

14. An adhesive label according to claim 13; wherein the intermediate layer comprises a low-adhesive layer having adhesive strength smaller than adhesive strength of the pressure-sensitive adhesive agent layer.

15. An adhesive label according to claim 13; wherein the intermediate layer comprises a heat-shielding layer made of a non-adhesive porous body.

16. An adhesive label according to claim 13, wherein the intermediate layer and the non-adhesive heat-reactive layer are thinner than the pressure-sensitive adhesive agent layer.

17. An adhesive label according to claim 13, wherein the pressure-sensitive adhesive agent layer is made of a material which has adhesiveness properties that do not change at the predetermined temperature for forming the openings in the non-adhesive heat-reactive layer.

18. An adhesive label according to claim 13, wherein the predetermined temperature for forming the openings in the non-adhesive heat-reactive layer is in a range of the glass transition point of the material constituting the non-adhesive heat-reactive layer or higher and the melting point of the material or lower.

19. An adhesive label according to claim 13, further comprising a printing layer formed on the other major surface of the support.

20. An adhesive label according to claim 13, wherein the thickness of each of the intermediate layer and the non-adhesive heat-reactive layer is 1 μm or less.

* * * * *